(12) United States Patent
Shimizu et al.

(10) Patent No.: US 9,074,618 B2
(45) Date of Patent: Jul. 7, 2015

(54) PREMIXED COMPRESSION SELF-IGNITION ENGINE

(71) Applicant: HONDA MOTOR CO., LTD., Tokyo (JP)

(72) Inventors: Yasuhiro Shimizu, Wako (JP); Sei Watanabe, Wako (JP); Yoshikazu Yamada, Wako (JP); Toru Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/139,406

(22) Filed: Dec. 23, 2013

(65) Prior Publication Data

US 2014/0209054 A1    Jul. 31, 2014

(30) Foreign Application Priority Data

Jan. 25, 2013  (JP) .................. 2013-011695

(51) Int. Cl.
*F02B 75/02*     (2006.01)
*F16C 7/02*      (2006.01)
(Continued)

(52) U.S. Cl.
CPC . *F16C 7/023* (2013.01); *F02B 1/12* (2013.01); *F01B 9/02* (2013.01); *F02B 75/32* (2013.01); F02B 2075/025 (2013.01); *F02B 25/04* (2013.01)

(58) Field of Classification Search
CPC .... F02D 41/3035; F02D 41/0057; F02B 1/12
USPC ...... 123/197.3, 197.4, 197.1, 27 R, 294, 295, 123/78 R, 78 A, 78 AA, 78 B, 78 BA, 78 C, 123/78 D, 78 E, 78 F, 58 R, 48 A, 48 AA, 48 B, 123/48 C, 48 D
See application file for complete search history.

(56) References Cited

U.S. PATENT DOCUMENTS 4,543,916 A     10/1985  Giorno
5,495,836 A *   3/1996   Wakabayashi et al. .. 123/339.13
(Continued)

FOREIGN PATENT DOCUMENTS

DE    10 2004 003910 A1    8/2005
EP         0 636 776 A1    2/1995
(Continued)

OTHER PUBLICATIONS

European Search Report dated Mar. 25, 2014, issued in corresponding European Patent Application No. 13197474 (2 pages).

*Primary Examiner* — Lindsay Low
*Assistant Examiner* — Long T Tran
(74) *Attorney, Agent, or Firm* — Westerman, Hattori, Daniels & Adrian, LLP

(57) ABSTRACT

In a premixed compression self-ignition engine which is compact but capable of exerting a high output, an intermediate portion of a trigonal link is rotatably supported on a crankpin, a large end portion of a connecting rod is connected to one end portion of the trigonal link, and a swing link swingably supported on a fulcrum shaft is connected to another end portion of the trigonal link. The engine includes: an intake port open to a crank chamber; a reed valve mounted in the intake port; a scavenging port configured to guide fresh air from the crank chamber into a cylinder bore in a downward stroke of a piston; an exhaust port provided in a cylinder head and open to a top portion of the cylinder bore; and an exhaust valve configured to be opened before the piston opens the scavenging port in the downward stroke of the piston.

2 Claims, 6 Drawing Sheets

(51) Int. Cl.
*F02B 1/12* (2006.01)
*F01B 9/02* (2006.01)
*F02B 75/32* (2006.01)
*F02B 25/04* (2006.01)

(56) References Cited

U.S. PATENT DOCUMENTS

| | | | | |
|---|---|---|---|---|
| 7,650,870 | B2* | 1/2010 | Fisher | 123/197.4 |
| 2002/0020368 | A1* | 2/2002 | Fujimoto et al. | 123/48 B |
| 2003/0217711 | A1* | 11/2003 | Geyer et al. | 123/73 PP |
| 2006/0102116 | A1* | 5/2006 | Maezuru et al. | 123/78 E |
| 2007/0289567 | A1* | 12/2007 | Eto et al. | 123/192.1 |
| 2008/0168957 | A1* | 7/2008 | Neese | 123/54.4 |
| 2009/0138174 | A1* | 5/2009 | Nishida et al. | 701/103 |
| 2009/0199811 | A1* | 8/2009 | Fisher | 123/197.4 |
| 2012/0330534 | A1* | 12/2012 | Cleeves et al. | 701/104 |

FOREIGN PATENT DOCUMENTS

| | | |
|---|---|---|
| JP | 2003-269232 A | 9/2003 |
| WO | 2007/057150 A1 | 5/2007 |
| WO | 2009/118614 A1 | 10/2009 |

\* cited by examiner

PREMIXED COMPRESSION SELF-IGNITION ENGINE

BACKGROUND OF THE INVENTION

1. Field of the Invention

The present invention relates to an improvement of a premixed compression self-ignition engine.

2. Description of the Related Art

Heretofore, premixed compression self-ignition engines have been employed in four-cycle engines as disclosed in Japanese Patent Application Laid-open No. 2003-269232.

SUMMARY OF THE INVENTION

Conventional premixed compression self-ignition four-cycle engines are characterized by their "high compression ratio" and "A/F lean combustion," and achieve a high thermal efficiency and low $NO_x$ emission. However, it is known that an operating range of such premixed compression self-ignition four-cycle engines is limited because it is difficult to control combustion under practical conditions, and that an usable load is limited, making it difficult to ensure an output, because knocking occurs at high loads. Methods for improving a thermal efficiency include a method in which a compact combustion chamber is employed to reduce a heat loss. Nevertheless, this requires that a piston have a stroke length as long as possible in relation to a cylinder bore diameter.

A method for expanding the operating range in premixed compression self-ignition combustion and ensuring the output without increasing an engine size has a problem of an increased number of auxiliaries such as a supercharger, an EGR system or the like, for practical use.

The present invention has been made in view of such circumstances. An object of the present invention is to provide a premixed compression self-ignition engine, which is compact but still capable of achieving a high thermal efficiency and low $NO_x$ emission while ensuring a practical output.

In order to achieve the object, according to a first aspect of the present invention, there is provided a premixed compression self-ignition engine comprising: a crankcase; a crankshaft and a fulcrum shaft supported on the crankcase such that axes of the crankshaft and the fulcrum shaft are parallel to each other; a trigonal link having an intermediate portion rotatably supported on a crankpin of the crankshaft; a connecting rod having a small end portion connected to a piston configured to be raised and lowered in a cylinder bore and a large end portion relatively rotatably connected to one end portion of the trigonal link; and a swing link having a base end portion rotatably supported on the fulcrum shaft and a swinging end portion relatively rotatably connected to another end portion of the trigonal link, wherein the engine further comprises: an intake port provided in the crankcase and open to a crank chamber in the crankcase; a reed valve mounted in the intake port and configured to be opened by pressure reduction in the crank chamber accompanying an upward stroke of the piston; throttle means for controlling a flow rate of fresh air supplied to the crank chamber through the intake port when the reed valve is opened; a scavenging port configured to be opened by the piston in a downward stroke of the piston and guide the fresh air from the crank chamber into the cylinder bore; an exhaust port provided in a cylinder head and open to a top portion of the cylinder bore; and an exhaust valve configured to be opened and discharge exhaust gas in the cylinder bore to the exhaust port before the piston opens the scavenging port in the downward stroke of the piston.

According to the first aspect of the present invention, employing the trigonal link and the swing link greatly increases the piston stroke while preventing enlargement of the crankcase as much as possible. This enables the cylinder bore with a small diameter and a compact combustion chamber. As a result, a heat loss is reduced, which enables an improvement in the thermal efficiency.

Furthermore, the engine includes: the scavenging port configured to be opened by the piston in the downward stroke of the piston and guide the fresh air from the crank chamber into the cylinder bore; the exhaust port provided in the cylinder head and open to the top portion of the cylinder bore; and the exhaust valve configured to be opened and discharge the exhaust gas in the cylinder bore to the exhaust port before the piston opens the scavenging port in the downward stroke of the piston. Accordingly, the engine is capable of performing a two-cycle operation enabling uniflow scavenging and discharge. Hence, setting an exhaust port diameter with respect to the scavenging port and an opening and closing timing of the exhaust valve as appropriate enables large-amount internal EGR introduction into a combustion chamber, which has been difficult in conventional four-cycle engines. In addition, combustion control is made possible in a wide range. Thus, the two-cycle engine operation having a higher specific output than a four-cycle engine operation achieves premixed compression self-ignition combustion with low $NO_x$ emission and a high thermal efficiency while ensuring a practical output without increasing the number of auxiliaries.

According to a second aspect of the present invention, in addition to the first aspect, a piston stroke/a cylinder bore diameter is ≥1.

According to the second aspect of the present invention, since the piston stroke/the cylinder bore diameter is ≥1, the cylinder bore is long, and a distance from the scavenging port to the exhaust port can be increased. Thus, an effect of reducing "blow-by of an air-fuel mixture (blow-by of unburned gas)," which has been a problem with conventional two-cycle engines, can be expected. Moreover, a flow path area of the scavenging port in the cylinder bore can be easily ensured, which has been a problem in a case of a high compression ratio. In other words, if the cylinder bore is short, the scavenging port area required for scavenging cannot be ensured.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention will be described below based on the accompanying drawings.

Figure 1:
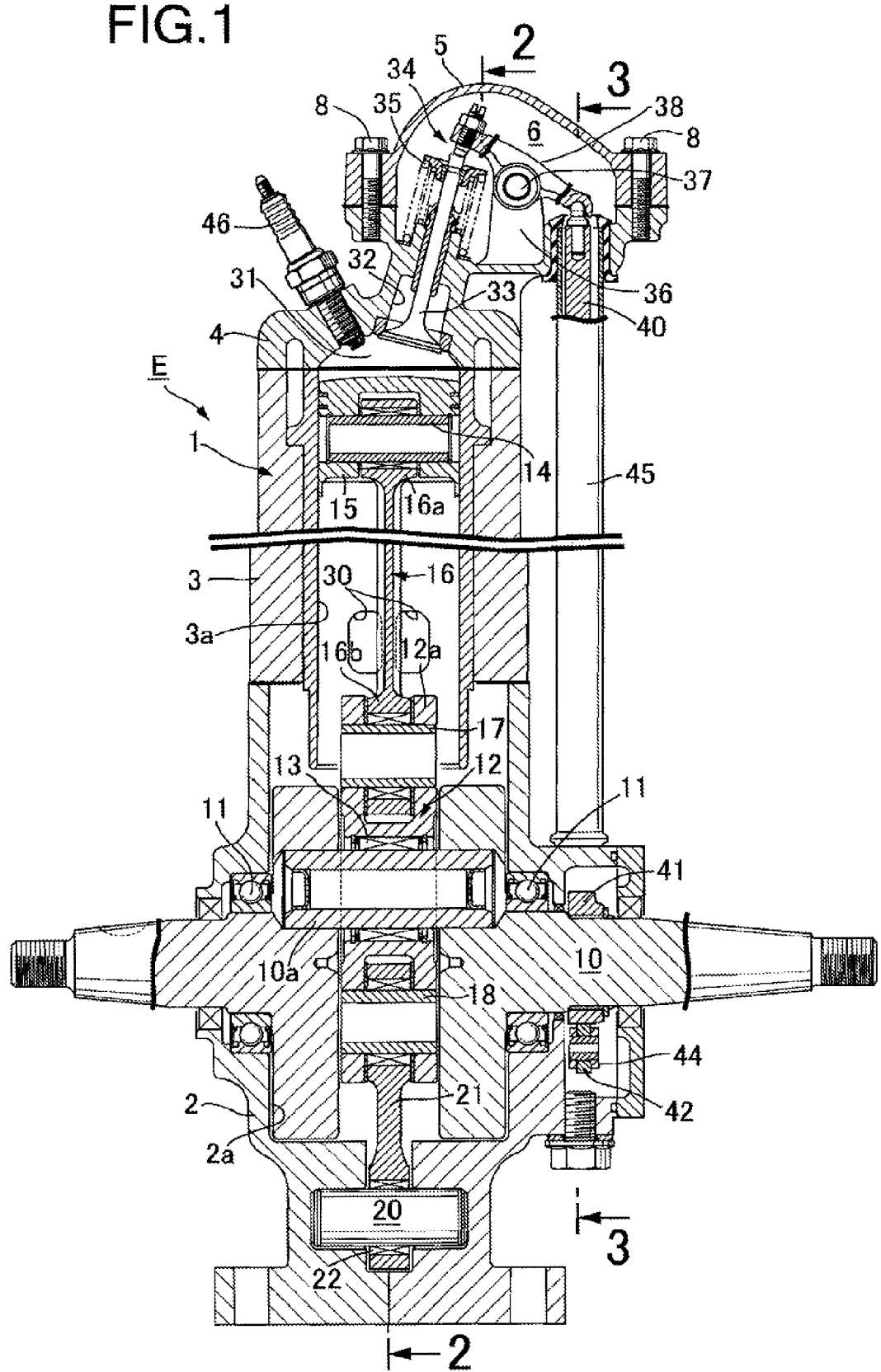
FIG. 1 is a longitudinal cross-sectional front view of a premixed compression self-ignition engine according to a first embodiment of the present invention (sectional view taken along a line 1-1 in FIG. 2)
Figure 2:
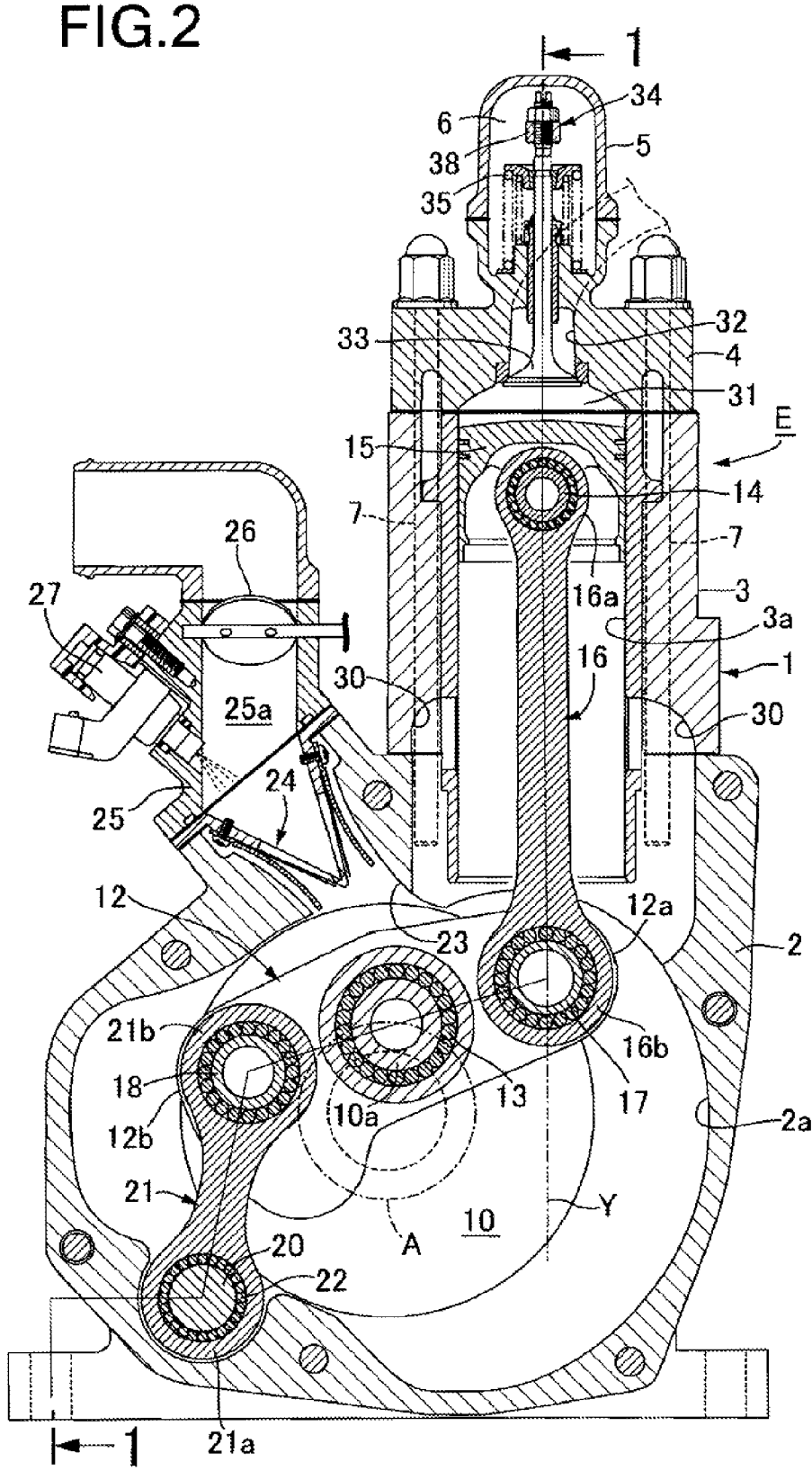
FIG. 2 is a sectional view taken along a line 2-2 in FIG. 1.

First of all, a first embodiment will be described. In FIGS. 1 and 2, an engine main body 1 of a premixed compression self-ignition engine E includes: a crankcase 2 whose inside is referred to as a crank chamber 2a; a cylinder block 3 provided upright and joined to an upper surface of the crankcase 2, the cylinder block 3 having a cylinder bore 3a therein; a cylinder head 4 joined to an upper end of the cylinder block 3; and a head cover 5 joined to an upper end of the cylinder head 4 and defining a valve operating chamber 6 between the cylinder head 4 and the head cover 5. The crankcase 2, the cylinder block 3, and the cylinder head 4 are fastened to each other with multiple stud bolts 7 implanted in the crankcase 2. The head cover 5 is fastened to the cylinder head 4 with multiple bolts 8.

In left and right side walls of the crankcase 2 (see FIG. 1), a crankshaft 10 whose crank portion is housed in the crank chamber 2a is supported with a pair of first bearings 11. Here, as shown in FIG. 2, the crankshaft 10 is disposed so that a rotation trajectory A of a center of a crankpin 10a thereof can come to one side (left side in FIG. 2) of an axis Y of the cylinder bore 3a. On the crankpin 10a, an intermediate portion of a trigonal link 12 is rotatably supported with a second bearing 13. To a right end portion 12a (FIG. 2), on the axis Y side, of the trigonal link 12, a large end portion 16b of a connecting rod 16 is relatively rotatably connected via a first connecting pin 17. The connecting rod 16 has a small end portion 16a connected to a piston 15 via a piston pin 14, the piston 15 being configured to be raised and lowered in the cylinder bore 3a.

At a left side (FIG. 2) of the crankshaft 10, which is a side opposite to the axis Y, and below the crankshaft 10, a fulcrum shaft 20 is supported on the crankcase 2. Axes of the fulcrum shaft 20 and the crankshaft 10 are parallel to each other. On the fulcrum shaft 20, a base end 21a of a swing link 21 is rotatably supported with a third bearing 22. An upper end portion, that is, a swinging end portion 21b, of the swing link 21 is relatively rotatably connected to a left end portion 12b of the trigonal link 12 via a second connecting pin 18.

One side wall of the crankcase 2 is provided with an intake port 23 open to the crank chamber 2a. A reed valve 24 is mounted in the intake port 23. A throttle body 25 configured to supply fresh air to the intake port 23 through the reed valve 24 is attached to the crankcase 2. The reed valve 24 is normally closed, but opened when pressure in the crank chamber 2a is reduced as the piston 15 is raised. The throttle body 25 has an intake passage 25a communicating with the intake port 23, and pivotally supports a throttle valve 26 configured to open and close the intake passage 25a. A fuel injection valve 27 configured to inject fuel toward the intake port 23 from the intake passage 25a located downstream of the throttle valve 26 is annexed to the throttle body 25.

The cylinder block 3 is provided with a pair of scavenging ports 30 configured to communicatively connect the crank chamber 2a to the cylinder bore 3a. These scavenging ports 30 are configured to be opened and closed by the piston 15, and are opened at an end of a downward stroke of the piston 15.

Figure 3:
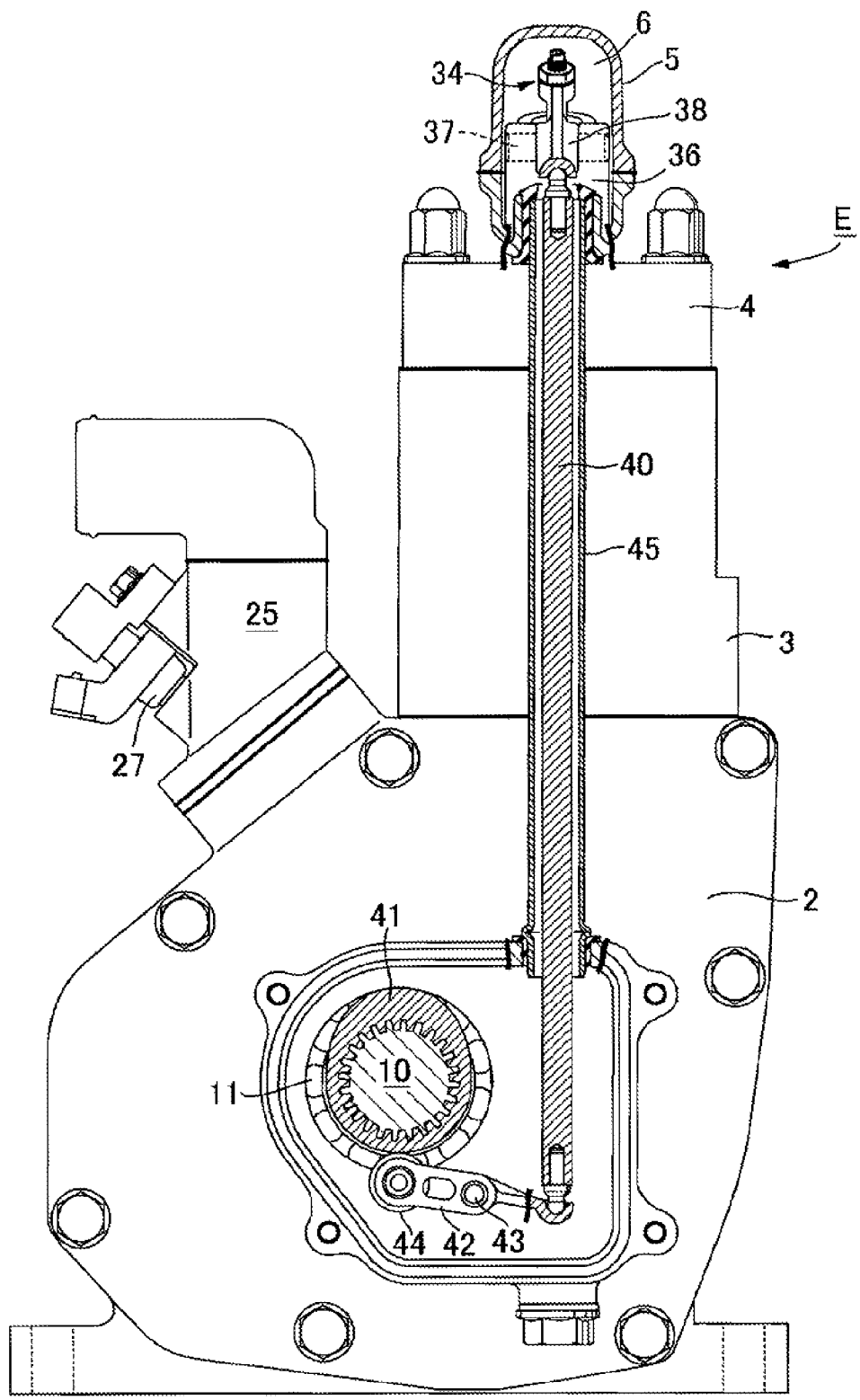
FIG. 3 is a sectional view taken along a line 3-3 in FIG. 1.

Moreover, as shown in FIGS. 2 and 3, a combustion chamber 31, to which a top surface of the piston 15 faces, and an exhaust port 32 open to the combustion chamber 31 are formed in the cylinder head 4. Moreover, the cylinder head 4 is provided with a poppet type exhaust valve 33 configured to open and close the exhaust port 32. Portions of a valve operating mechanism 34 configured to drive the exhaust valve 33 to open and close are placed in the valve operating chamber 6. The valve operating mechanism 34 includes a valve spring 35 mounted on the exhaust valve 33 and configured to bias it in a valve closing direction, and an upper rocker arm 38 supported by a support 36 on the cylinder head 4 via an upper rocker shaft 37. One end portion of the upper rocker arm 38 is connected continuously with a head portion of the exhaust valve 33.

Another end portion of the upper rocker arm 38 is connected continuously with an upper end portion of a push rod 40 placed at one side of the cylinder block 3. A lower end portion of the push rod 40 is connected continuously with a cam 41 fixed to the crankshaft 10, via a lower rocker arm 42. The lower rocker arm 42 is supported on the crankcase 2 via a lower rocker shaft 43. One end portion of the lower rocker arm 42 is connected continuously with the lower end portion of the push rod 40. A roller 44 pivotally supported by the another end portion of the lower rocker arm 42 is rollably engaged with an outer peripheral surface of the cam 41. The push rod 40 is housed in a hollow rod case 45 connected between the crankcase 2 and the cylinder head 4.

A compression ratio of this engine E is set so that an air-fuel mixture compressed in the combustion chamber 31 can perform self-ignition at an end of an upward stroke of the piston 15. An ignition plug 46 for performing spark ignition of the air-fuel mixture in the combustion chamber 31, is screwed in the cylinder head 4 only when the engine started.

Next, operations of this embodiment will be described.

After started, the engine E operates as follows. First, at a time of the upward stroke of the piston 15, the pressure in the crank chamber 2a is reduced accompanying the upward stroke; thereby, the reed valve 24 is opened. While forming an air-fuel mixture, fresh air whose flow amount is controlled by the throttle valve 26 and fuel injected by the fuel injection valve 27 are sucked into the crank chamber 2a through the reed valve 24 and the intake port 23.

Next, when the downward stroke of the piston 15 begins, the air-fuel mixture in the crank chamber 2a is compressed, and the piston 15 opens the scavenging ports 30. Hence, the air-fuel mixture is sent into the cylinder bore 3a through the scavenging ports 30. At this time, as soon as the pressure in the crank chamber 2a is increased, the reed valve 24 is closed, blocking a backflow of the air-fuel mixture toward the throttle valve 26.

Subsequently, when the upward stroke of the piston 15 begins again, the piston 15 closes the scavenging ports 30, and then compresses the air-fuel mixture in the cylinder bore 3a.

When the piston 15 comes to a vicinity of a top dead center, the air-fuel mixture performs self-ignition, combusts, and expands, and thus the piston 15 is lowered. During the lowering, before the piston 15 opens the scavenging ports 30, the cam 41 pushes up the push rod 40 via the lower rocker arm 42 in synchronism with rotation of the crankshaft 10, opens the exhaust valve 33 via the upper rocker arm 38, and discharges exhaust gas in the cylinder bore 3a to the exhaust port 32 of the cylinder head 4. Accordingly, the engine E performs a two-cycle operation, and a flow of the scavenging and exhaust gas flowing from the scavenging ports 30 to the exhaust port 32 through the cylinder bore 3a is uniflow with few curves.

Figure 4A:
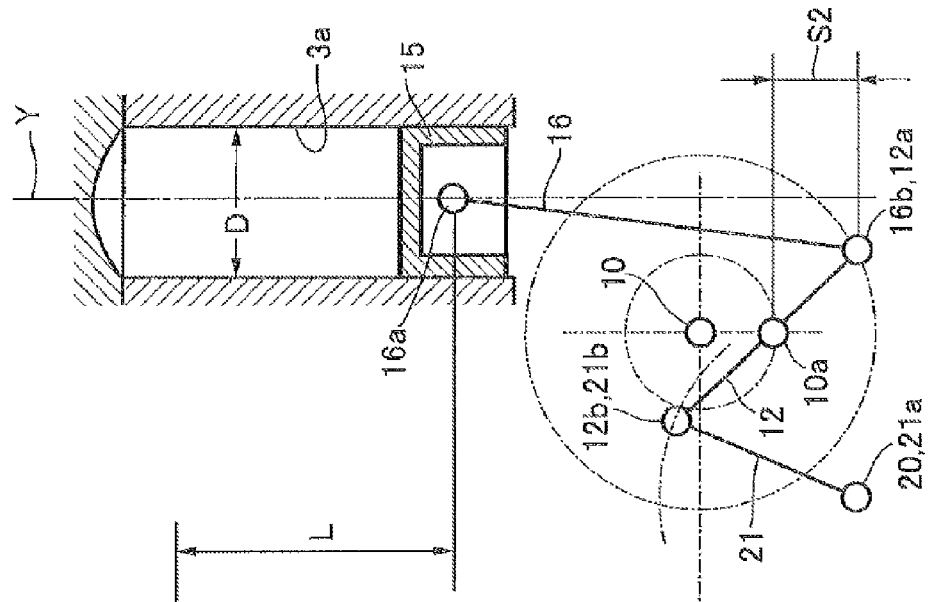
FIG. 4A-FIG. 4B are an operation explanatory view of the engine.
Figure 4B:
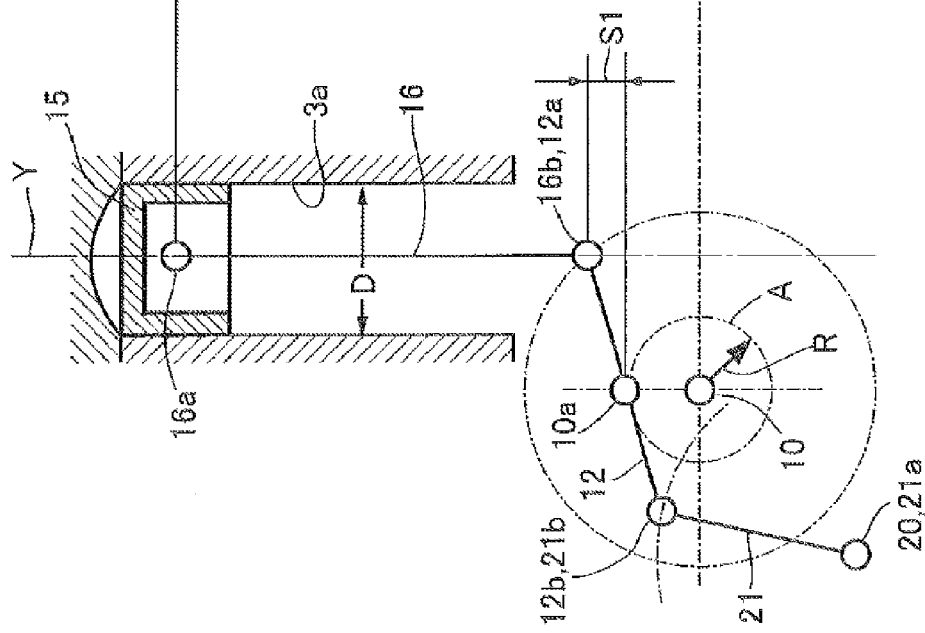

Raising and lowering operations of the piston 15 are transmitted to the crankpin 10a via the connecting rod 16 and the trigonal link 12 so that the crankshaft 10 is driven to rotate. During this time, as the swing link 21 laterally swings around the fulcrum shaft 20, the trigonal link 12 swings in an up and down direction around the crankpin 10a. Accordingly, at the top dead center of the piston 15 as shown in FIG. 4A, the large end portion 16b of the connecting rod 16 is pushed up by the right end portion 12a of the trigonal link 12 by a distance S1 above the crankpin 10a. Meanwhile, at a bottom dead center of the piston 15 as shown in FIG. 4B, the large end portion 16b of the connecting rod 16 is pushed down by the right end portion 12a of the trigonal link 12 by a distance S2 below the crankpin 10a. As a result, a stroke L of the piston 15 extends by a sum of the distances S1 and S2 in comparison with a normal engine in which the large end portion 16b of the connecting rod 16 is directly connected to the crankpin 10a, and which has a same crank radius R. Thus, the engine E of the present invention makes it possible to greatly increase the piston stroke L while preventing enlargement of the crankcase as much as possible. The piston stroke L is set to be equal to or larger than a diameter D of the cylinder bore 3a. Further, employing the trigonal link 12 and the swing link 21 described above reduces a swing angle of the connecting rod 16 in comparison with normal type engines. This makes it possible to avoid interference between a lower end portion of a cylinder sleeve and the connecting rod 16 while enabling the cylinder bore 3a with a small diameter, and the connecting rod 16 can be shortened so that an overall height of the engine E can be minimized.

Furthermore, the engine E includes: the scavenging ports 30 configured to be opened by the piston 15 in the downward stroke of the piston 15 and guide fresh air from the crank chamber 2a into the cylinder bore 3a; the exhaust port 32 provided in the cylinder head 4 and open to a top portion of the cylinder bore 3a; and the exhaust valve 33 configured to be opened and discharge exhaust gas in the cylinder bore 3a to the exhaust port 32 before the piston 15 opens the scavenging ports 30 in the downward stroke of the piston 15. An EGR amount is controlled by setting an opening and closing timing of the exhaust valve 33 so that self-ignition combustion of the air-fuel mixture in the cylinder bore 3a can be controlled. Accordingly, the engine E performs the two-cycle operation enabling uniflow scavenging and discharge, and is capable of ensuring the EGR amount required for premixed compression self-ignition combustion without increasing the number of auxiliaries. Moreover, the two-cycle engine operation having a higher specific output than a four-cycle engine operation achieves premixed compression self-ignition combustion with low $NO_x$ emission and a high thermal efficiency while ensuring a practical output.

In this way, it is possible to provide the compact premixed compression self-ignition engine E having a favorable thermal efficiency, an excellent low-fuel-consumption property, and a high output.

Figure 5:
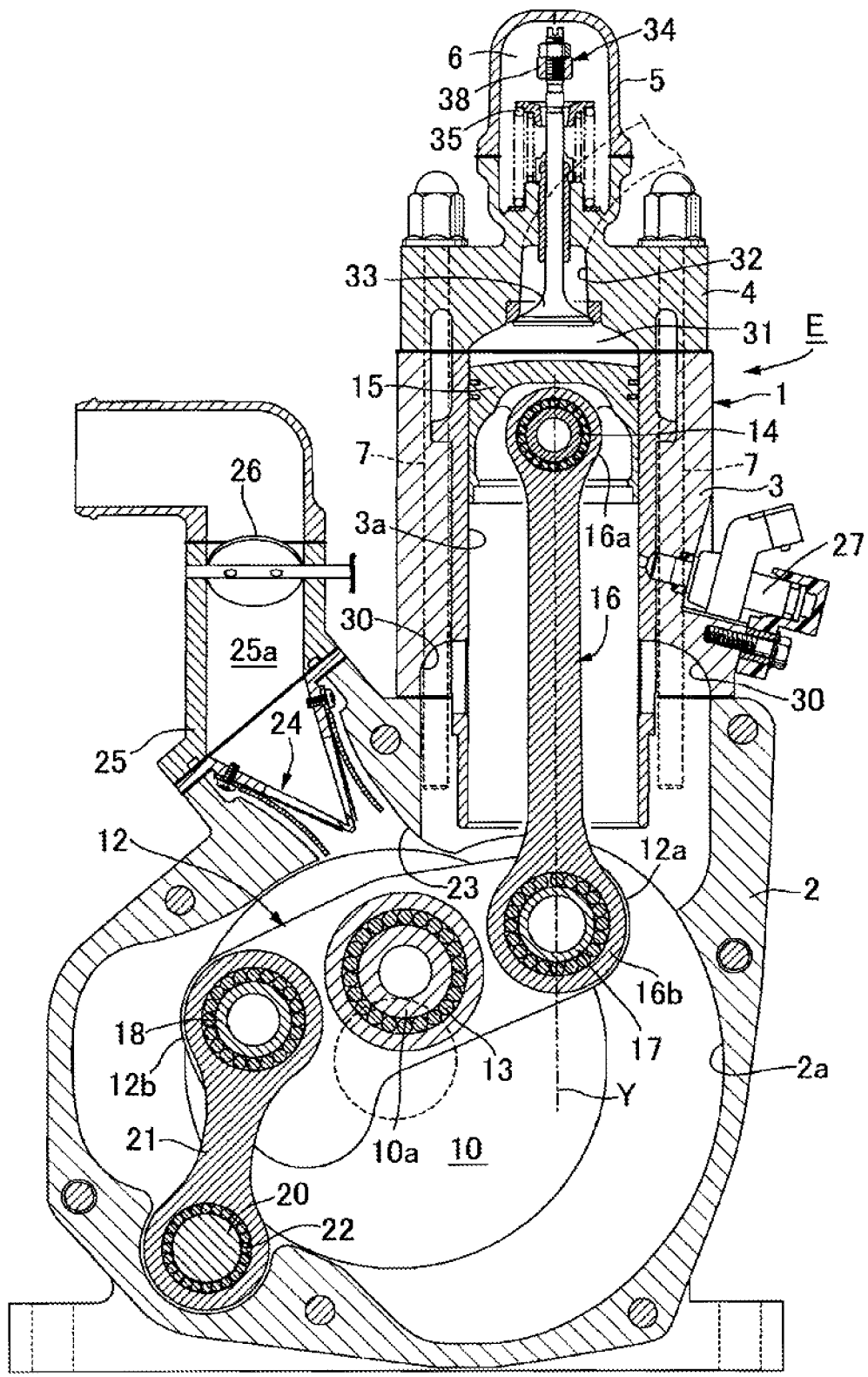
FIG. 5 is a view for illustrating a second embodiment of the present invention, corresponding to FIG. 2.

FIG. 5 shows a second embodiment of the present invention. The fuel injection valve 27 is attached to the cylinder block 3, and fuel is injected into the cylinder bore 3a to form an air-fuel mixture after the piston 15 closes the scavenging ports 30 in the upward stroke of the piston 15. Since other configurations and operations are the same as those in the above embodiment, components corresponding to those in the above embodiment are denoted by the same reference symbols in FIG. 5, and overlapping descriptions are omitted.

Figure 6:
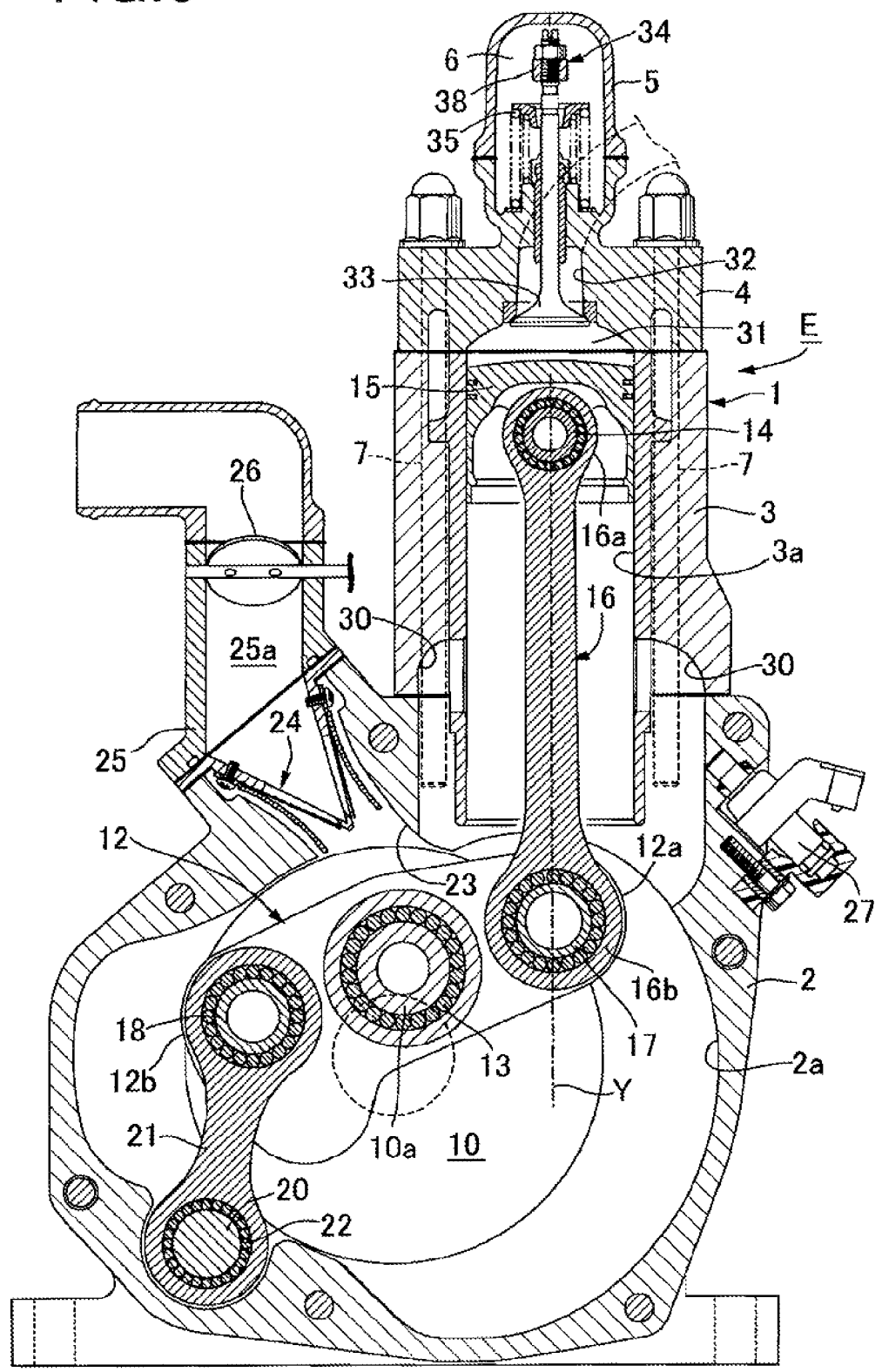
FIG. 6 is a view for illustrating a third embodiment of the present invention, corresponding to FIG. 2.

FIG. 6 shows a third embodiment of the present invention. The fuel injection valve 27 is attached to the crankcase 2, and fuel is injected into the scavenging ports 30. Since other configurations and operations are the same as those in the first embodiment, components corresponding to those in the above embodiment are denoted by the same reference symbols in FIG. 6, and overlapping descriptions are omitted.

It should be noted that the present invention is not limited to the above-described embodiments, and various design modifications can be made within the scope not departing from the gist thereof.

What is claimed is:

1. A premixed compression self-ignition engine comprising:
   a crankcase;
   a crankshaft and a fulcrum shaft supported on the crankcase such that axes of the crankshaft and the fulcrum shaft are parallel to each other;
   a trigonal link having an intermediate portion rotatably supported on a crankpin of the crankshaft;
   a connecting rod having
      a small end portion connected to a piston configured to be raised and lowered in a cylinder bore and
      a large end portion relatively rotatably connected to one end portion of the trigonal link; and
   a swing link having
      a base end portion rotatably supported on the fulcrum shaft and
      a swinging end portion relatively rotatably connected to another end portion of the trigonal link, wherein
   the engine further comprises:
   an intake port provided in the crankcase and open to a crank chamber in the crankcase;
   a reed valve mounted in the intake port and configured to be opened by pressure reduction in the crank chamber accompanying an upward stroke of the piston;
   throttle means for controlling a flow rate of fresh air supplied to the crank chamber through the intake port when the reed valve is opened;
   a scavenging port configured to be opened by the piston in a downward stroke of the piston and guide the fresh air from the crank chamber into the cylinder bore;
   an exhaust port provided in a cylinder head and open to a top portion of the cylinder bore; and
   an exhaust valve configured to be opened and discharge exhaust gas in the cylinder bore to the exhaust port before the piston opens the scavenging port in the downward stroke of the piston,
   wherein the fulcrum shaft is stationary.

2. The premixed compression self-ignition engine according to claim 1, wherein a ratio of a piston stroke to a cylinder bore diameter is greater than or equal to 1.

* * * * *